N. W. Wheeler,
Oscillating Steam Engine.
Nº 18,258. Patented Sep. 22, 1857.
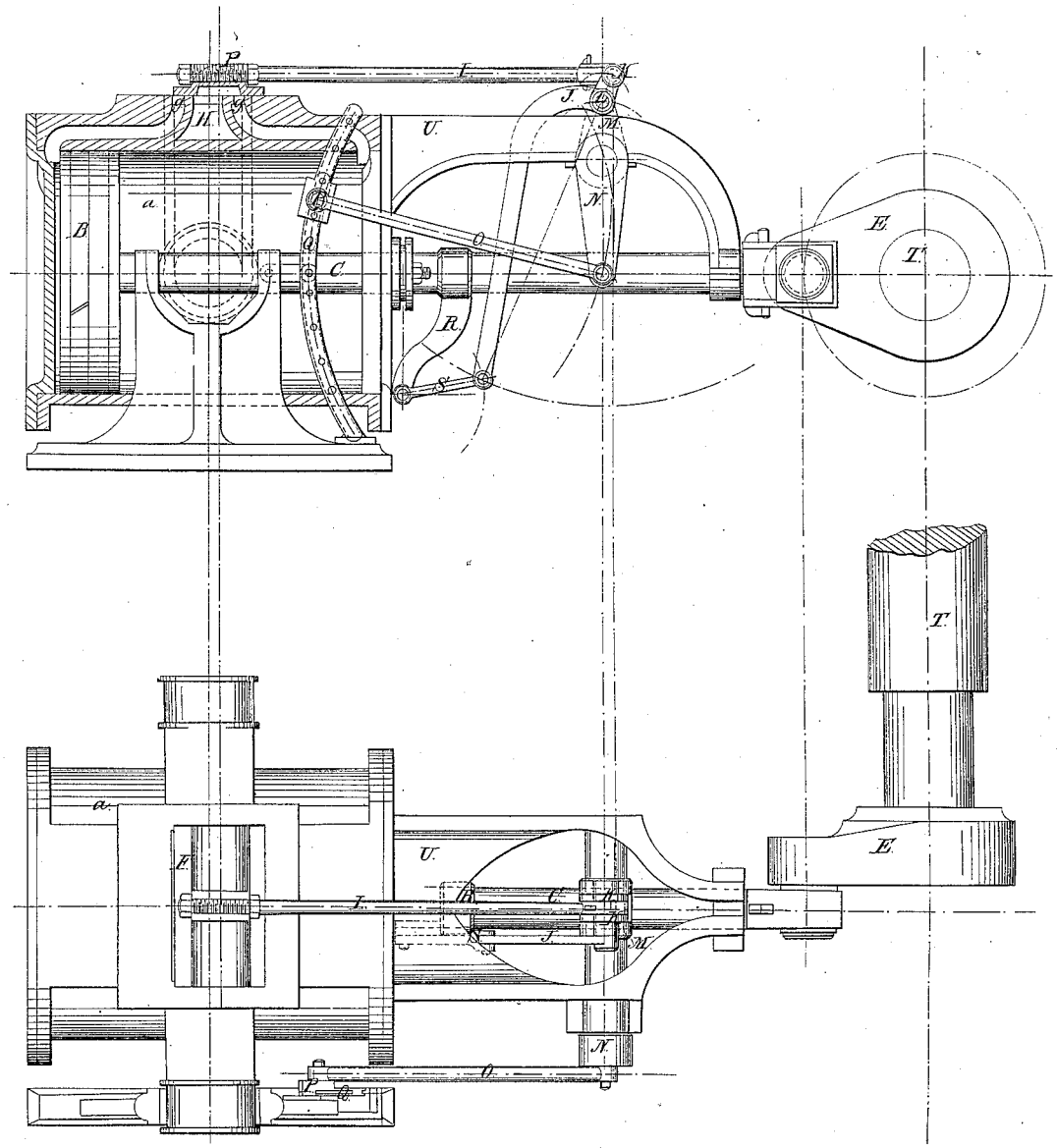

UNITED STATES PATENT OFFICE.

NORMAN W. WHEELER, OF NEW YORK, N. Y.

VALVE-GEAR FOR OSCILLATING STEAM-ENGINES.

Specification of Letters Patent No. 18,258, dated September 22, 1857.

*To all whom it may concern:*

Be it known that I, NORMAN W. WHEELER, of the city and State of New York, have invented a new and Improved Valve-Gear for Oscillating Steam-Engines; and I do hereby declare that the following is a full and exact description thereof, reference being had to the accompanying drawings and to the letters of reference marked thereon.

The nature of my invention consists in actuating the ordinary known valves of an oscillating steam engine by a certain combination of parts, connections and dead-link, whereby the whole movement of the valve or valves may be effected by and derived from the joint movements of the working cylinder and piston rod, without having recourse to eccentrics, cams, or other like devices.

To enable others, skilled in the art to make and use my invention I will proceed to describe its construction and operation.

I construct the cylinder A, valves F, pisto B, piston rod C, crank E and main shaft T in the ordinary known forms, and apply thereto the bracket U, projecting from the cylinder-head for the purpose of carrying the rock-shaft with its arms M and N. Upon the rock-arm M I place a secondary rock shaft or arm, which can oscillate upon the bearing L, and takes hold of the valve rod I at K. This secondary rock-shaft is actuated independently of the rock arm M by means of the lead-lever J, which is connected with and moved by the piston rod through and by means of the link S and stud R. The motion in this manner derived from the piston rod should equal the lap and desired lead of the valve F. The remainder of the desired valve-throw is derived directly from the oscillation of the working cylinder by means of and through the rock-shaft and rock-arms M and N, and the radius-rod O, which is connected at one end with an arm N and at the other is held firmly stationary at any desired point, say at P, of the fixed or dead-link Q, which should be the arc of a circle with its center coincident with the center of the pin of the arm N when the engine stands at either of its dead-points or centers.

It will be seen by inspection of the drawings that when the engine stands at or approaches either center the proper lead of the valve will be given by means of the piston motion, and after the center is passed the valve will be further opened by means of the cylinder motion because during the early part of the stroke the movement from the cylinder will be greater than the movement from the piston, but if the radius rod is fixed near the center line of the engine, or nearly parallel thereto, the piston movement may predominate before the cylinder has reached the extreme of its vibration and commence the closing movement of the valve, while in the latter part of the half revolution both movements aid in first closing and then giving lead to the valve, wherever the radius rod, may be held, within its proper limits, and not exactly parallel with the piston rod;—thus may be obtained, not only a valve throw for full stroke by very simple and easily constructed parts, but a "lap and lead cut-off" which may be modified at pleasure by changing the angle which the radius-rod shall make with the piston-rod when the engine stands at center, while the direction in which the crank will rotate will depend upon whether the end of the radius rod is fixed above or below the center line of the engine.

I am aware that "eccentric throw" and "piston lead," and that "oscillating throw" and "eccentric" or "cam" "lead" have before been used—these I do not claim but What I do claim and desire to secure by Letters Patent is, Actuating the valves of oscillating steam engines by the combined movements of the cylinder and piston rod substantially as described.

NORMAN W. WHEELER.

Witnesses:
JOHN COCHRANE,
C. E. HOLDEN.